Jan. 11, 1944.  E. B. JESTICO  2,339,171
TOOL FOR PERFORMING INTERNAL MACHINING OPERATIONS AT AN
ANGLE TO THE AXIS OF A BORE OR TUBULAR MEMBER
Filed Nov. 4, 1942
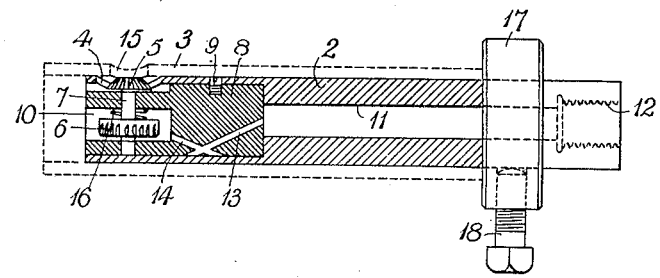
Fig:1.
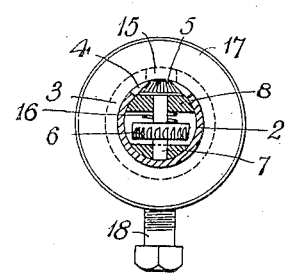
Fig:2.
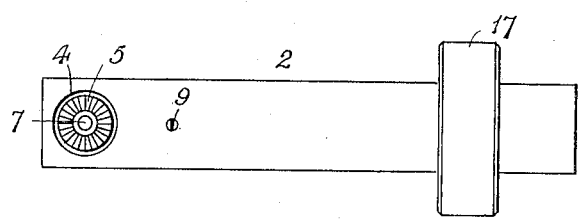
Fig:3.
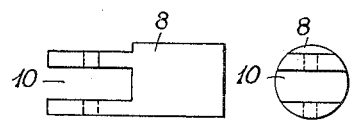
Fig:4.   Fig:5.
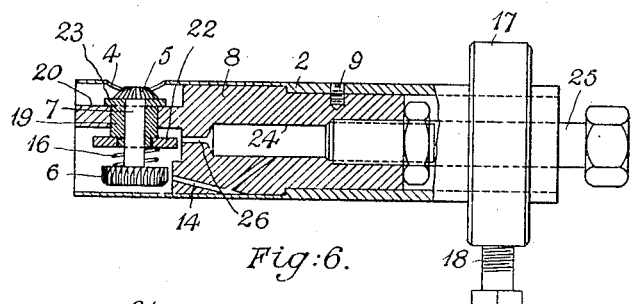
Fig:6.
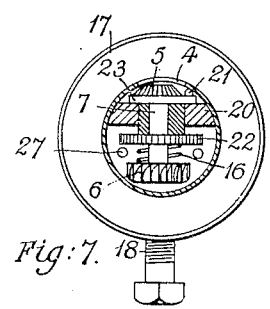
Fig:7.
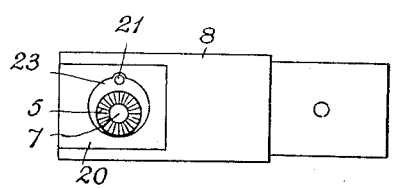
Fig:8.
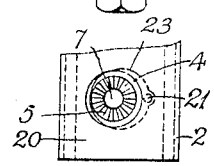
Fig:9.
Inventor
Edward B. Jestico
by Babcock & Babcock
Attorneys Patented Jan. 11, 1944

2,339,171

UNITED STATES PATENT OFFICE 2,339,171

TOOL FOR PERFORMING INTERNAL MACHINING OPERATIONS AT AN ANGLE TO THE AXIS OF BORES OR TUBULAR MEMBERS

Edward Bertram Jestico, Coventry, England

Application November 4, 1942, Serial No. 464,492
In Great Britain December 13, 1941

4 Claims. (Cl. 77—32)

This invention relates to a tool for performing internal machining operations at an angle to the axis of a bore or tubular member, and has for its object to enable the inner ends of holes opening into a bore or tubular member to be countersunk, counterbored or otherwise machined, to enable oil grooves to be machined in said bore, and also to enable holes to be drilled from the inside of said bore or member at any desired angle to the axis thereof.

A further object of the invention is to provide for an automatic feed for the cutter or drill of said tool.

Another object of the invention is to obtain a uniform operation of the cutter at all parts of the edge of the hole.

According to the invention the tool forming the subject matter thereof comprises a body consisting of a bar or tube, having an opening at one side, a cutter or the like mounted for rotation therein about an axis at an angle to the axis of said body, and means for rotating said cutter and for giving the same an automatic feed movement outwardly of the axis of said body.

The invention also includes an arrangement in which, for the purpose of obtaining a uniform operation of the cutter at all parts of the edge of the hole in the work-piece the cutter is rotatably mounted eccentrically in a bush which is independently rotated about an axis passing through the centre of said hole, the feed movement of said cutter being controlled by means of a pin carried by the bush and bearing against the marginal edge of the opening in said body.

In the accompanying drawing,

Figure 1 is a view in axial plane section of one form of the improved tool.

Figure 2 is a cross-sectional view thereof at the axis of the cutter.

Figure 3 is a plan view.

Figure 4 is a detail view of the holder.

Figure 5 is an end view of the same.

Figure 6 is a view similar to Figure 1 of another form of the improved tool.

Figure 7 is a cross-sectional view thereof at the axis of the cutter.

Figure 8 is a detail plan view in plan of the holder.

Figure 9 is a part plan view of Figure 7 showing the eccentricity of the bush.

Throughout the drawing like parts are designated by similar reference characters.

Referring to the construction shown in Figures 1 to 5, the improved tool comprises a body 2 consisting of a bar adapted for insertion in the work-piece 3, represented in dotted lines in Figures 1 and 2, and having an opening 4 at one side, a cutter 5 rotatably mounted in said body and adapted to protrude through said opening, and an impeller 6 secured to the spindle 7 of the cutter and adapted to be driven by hydraulic or pneumatic power.

The end of the body 2 carrying the cutter or drill is recessed to receive a removable holder 8 in which the cutter spindle 7, or drill shank, is rotatably mounted. The said holder, which is shown separately in Figures 4 and 5, is fixed in the recessed end of the body by means of a screw 9 and is slotted longitudinally at 10 to accommodate the impeller 6.

The body 2 is bored with a longitudinal hole 11, the outer end 12 of which is tapped internally for connection with a pipe leading to a source of hydraulic or pneumatic power. The inner end of said hole communicates by means of an outwardly inclined duct 13 with an inwardly and upwardly inclined delivery jet 14 for the working fluid, said jet being arranged at such an angle to the axis of the impeller 6 as to rotate the cutter and also to feed it automatically through the opening 4 in the periphery of the recessed end of the body and into operative contact with the edge of the hole 15 in the work-piece 3.

The cutter is normally held in the inoperative position within the periphery of the body by means of a spring 16 arranged between the impeller 6 and the slotted end of the holder. The extent of the feed movement may be adjusted by means of shims introduced onto the cutter spindle between the impeller and one side of the slot in the holder.

The working fluid is admitted at the outer end 12 of the body and is controlled by means of a valve or otherwise in such a manner as to first rotate the cutter until it reaches its cutting speed and to then feed the cutter outwardly against the action of the spring 16.

In use, the end of the body carrying the cutter is inserted in the bore of the work-piece to such a distance as to bring the cutter to the desired position. This may be determined by means of a collar 17 adjustably mounted on the body 2 and adapted to be locked thereto by means of a screw 18. The pneumatic or hydraulic power is then turned on to rotate the cutter, the fluid being directed by the jet 14 onto the blades of the impeller 6.

If the job in hand is, as shown, to remove burrs from the inner end of a radial hole in the wall of the work-piece the axis of the cutter will be arranged at right angles to the axis thereof. The tool may, however, be employed for drilling holes having their axes at any desired angle to the axis of the work-piece in which case the cutter or drill will be mounted in the holder with its axis at the appropriate angle.

On the completion of the internal machining operation the spring 16 returns the cutter to a position within the outer peripheral surface of the body which can then be freely withdrawn from the work-piece.

Where two or more operations are required at different longitudinal and/or angular positions the body can be provided with adjustable locating stops.

Owing to the transverse curvature of the internal surface of the work-piece and to the fact that the cutter rotates in a flat plane, the amount of metal removed by the tool above described is not uniform at all points around the inner edge or end of the hole 15, the cutter first engaging those parts of the hole nearest to it and continuing to remove metal therefrom until the feed movement has brought the cutter into engagement with those parts of the hole further from it. For some purposes this absence of uniformity may not be of any serious consequence. The invention, however, includes an arrangement whereby the amount of metal removed is uniform at all points around the inner edge or end of the hole.

A tool having this advantage is shown in Figures 6 to 9. In this case the cutter 5 is rotatably mounted eccentrically in a bush 19 which is independently rotated in a lug 20 on the holder 8 about an axis passing through the centre of the opening 4 in the body 2, and its feed movement is controlled by one or more pins 21 carried by the bush and bearing against the marginal edge of said opening. By these means the cutter during its rotation is caused by its eccentric movement in the bush to travel around the edge of the hole in the work-piece and to operate uniformly thereon at all points. At the same time the co-action between the pin 21 and the inside marginal edge of the opening in the body 2 controls the feed movement of the cutter so that an equal amount of metal is progressively removed at all points around the hole in the work-piece.

The independent rotation of the bush in the holder may be produced by pneumatic or hydraulic power, for which purpose the said bush is reduced at one end to carry a secondary impeller 22. The said bush is slidably mounted in the holder 8 and has a flange 23 at the other end carrying the aforesaid pin 21 and bearing behind the head of the cutter 5. The rotation of the latter and its automatic feed movement against the action of a spring 16 is produced, as in the former instance, by pneumatic or hydraulic power acting on the primary impeller 6 secured to the cutter spindle 7.

Both impellers may be driven from the same source of power, the holder in this case being formed with a central bore 24 which is connected at its outer end with a pipe 25 communicating with a hydraulic or pneumatic pump or with a compressed air container. The inner end of this bore opens to a jet 26 for delivering the working fluid to the secondary impeller 22 and with an upwardly directed jet 14 for delivering the working fluid to the primary impeller 6.

When the improved tool in either of its forms is employed in finishing lateral holes in a bore or tubular member closed at one end and the cutter is driven by fluid pressure, suitable provision such as holes 27 in the holder will, of course, be made for the exhaust of the working fluid.

In either of the above described tools the use of fluid pressure for operating the cutter has the additional advantages that the tool is automatically cooled and machining swarf removed thereby. By using oil or oil-carrying air, as the working fluid the further advantage of automatic lubrication is also obtained.

I claim:

1. A tool for the purposes described comprising a tubular body having an opening at one side and adapted for insertion in the work-piece, a holder fixed in said body, a bush rotatably mounted in said holder, a spindle rotatably mounted in said bush eccentrically thereto, a pin on said bush engaging the inside marginal edge of the opening in said body, a cutter fixed to said spindle, and means for rotating said bush and spindle independently of each other and at the same time giving the cutter an axial feed movement through the opening in said body.

2. A tool for the purposes described comprising a tubular body having an opening at one side and adapted for insertion in the work-piece, a holder fixed in said body, a bush rotatably mounted in said holder and adapted for connection with a source of fluid pressure, a spindle rotatably mounted in said bush eccentrically to the axis thereof, a cutter fixed to said spindle, means associated with said bush and adapted for co-operation with the inside marginal edge of the opening in said body for controlling the axial movement of said spindle, and fluid-operated means for rotating said bush and spindle independently of each other and for giving the cutter an axial feed movement through the opening in said body.

3. A tool for the purposes described comprising a body adapted for insertion in the work-piece and having an opening at one side, a cutter rotatably mounted in said body about an axis at an angle to the axis thereof, means for giving the cutter an eccentric motion with respect to the hole in the work-piece and for controlling the feed movement of said cutter, and fluid-operated means for rotating said cutter about its axis and for giving it an axial feed movement through the opening in said body.

4. A tool for the purposes described comprising a tubular body having a lateral opening, said body being adapted for insertion in the work-piece and for connection with an external source of fluid pressure, a forked holder fixed in said body, a spindle rotatably mounted in the fork of said holder about an axis at an angle to the axis of said body, said spindle being free to slide axially in said fork, a cutter secured to one end of said spindle and adapted to protrude through the lateral opening in said body, an impeller secured to said spindle in the fork of the holder, a spring normally retaining the cutter in its inoperative position within said lateral opening, and means associated with said holder for directing a jet of fluid under pressure onto said impeller in a direction to rotate said spindle and to move it axially against the pressure of said spring.

EDWARD BERTRAM JESTICO.